United States Patent
Wensink et al.

(10) Patent No.: US 6,621,053 B1
(45) Date of Patent: Sep. 16, 2003

(54) TOASTER OVEN RACK

(75) Inventors: Theodore C. Wensink, St. Joseph, MI (US); Gregory O. Raklovits, St. Joseph, MI (US); Dov Z. Glucksman, Wenham, MA (US)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 10/065,637

(22) Filed: Nov. 5, 2002

(51) Int. Cl.[7] .................. A47F 57/06; A47F 43/18; A47F 36/00; A21B 3/00
(52) U.S. Cl. .................. 219/411; 219/392; 126/337 R; 99/399
(58) Field of Search .................. 219/411; 126/337 R; 99/399

(56) References Cited

U.S. PATENT DOCUMENTS

| | | | |
|---|---|---|---|
| 3,845,272 A | 10/1974 | Schultz | 219/386 |
| 3,859,903 A | 1/1975 | Kipp | 99/391 |
| 4,189,632 A | 2/1980 | Swanson et al. | 219/413 |
| 4,254,325 A | 3/1981 | Snyder | 219/413 |
| 4,476,848 A * | 10/1984 | Protas | 126/337 R |
| 4,656,337 A | 4/1987 | Lastofka et al. | 219/386 |
| 5,562,023 A * | 10/1996 | Harrison | 126/337 R |
| 5,650,085 A | 7/1997 | Chen | 219/732 |
| 6,337,466 B1 * | 1/2002 | Chasen | 219/411 |

* cited by examiner

*Primary Examiner*—Joseph Pelham
(74) *Attorney, Agent, or Firm*—Thomas J. Roth; Robert O. Rice; John F. Colligan

(57) ABSTRACT

A reversible rack for an electric toaster oven that includes a frame and a plurality of support wires. At least some of the support wires have a plurality of projections on a first side of the rack. When the rack is positioned in the oven with the first side up, the projections carry food items placed on the rack substantially out of contact with the support wires. When the rack is positioned with the first side down the rack is arranged to support items on the substantially flat surface of the second side of the rack. The rack frame can have end members offset from the plane of the rack in the opposite direction of the projections. When the rack is positioned in the toaster oven with the projections up the rack is higher in the oven than when rack is positioned in toaster oven with the projections down.

20 Claims, 5 Drawing Sheets

TOASTER OVEN RACK

BACKGROUND OF INVENTION

The present invention relates to a rack for an electric toaster oven and more particularly to a rack having a plurality of projections on one side of the rack to support food items substantially out of contact with the rack.

Electric toaster ovens are well known kitchen appliances that are used to toast bread and cook foods. Such toaster ovens conventionally have a wire form rack for supporting foods in the toaster oven cavity for toasting or cooking. One drawback of prior art toaster ovens is that when bread is toasted on a wire form rack the side of the bread resting on the rack will have a series of lines due to incomplete toasting of the bread in contact with the wires.

The invention is concerned with providing a rack for a toaster oven that solves the problem of achieving uniformly colored toast in a toaster oven. The invention is further concerned with providing a reversible rack for a toaster oven arranged to support bread substantially out of contact with the rack for toasting in one position, and when inverted for supporting items to be cooked on a substantially flat surface.

SUMMARY OF INVENTION

The present invention can be summarized as a toaster oven rack having a frame and support wires wherein at least some of the support wires have a plurality of projections on a first side of the rack arranged to engage and support food substantially out of contact with the support wires.

DETAILED DESCRIPTION

Figure 1:
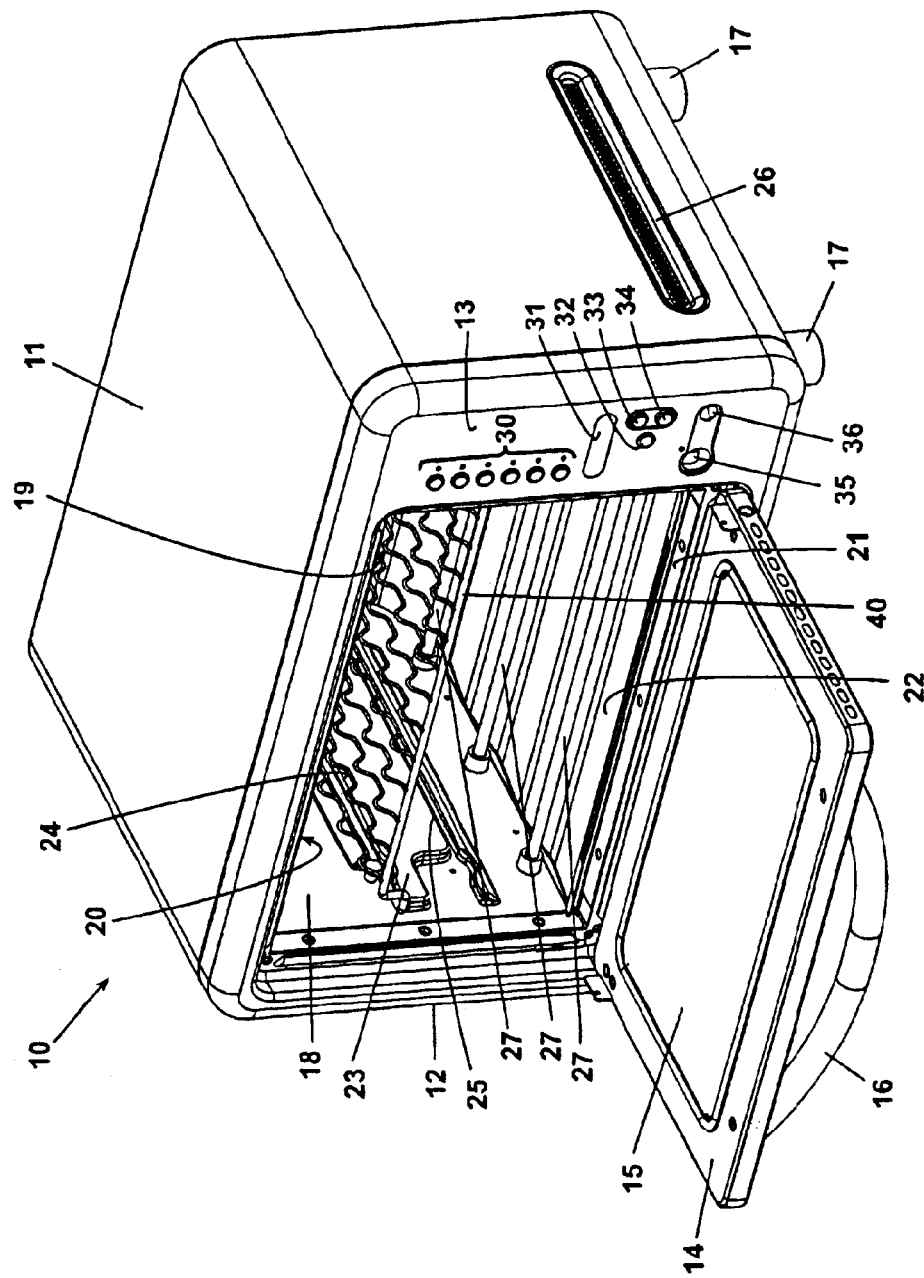
FIG. 1 is a perspective view of a toaster oven including a rack according to the present invention.
Figure 2:
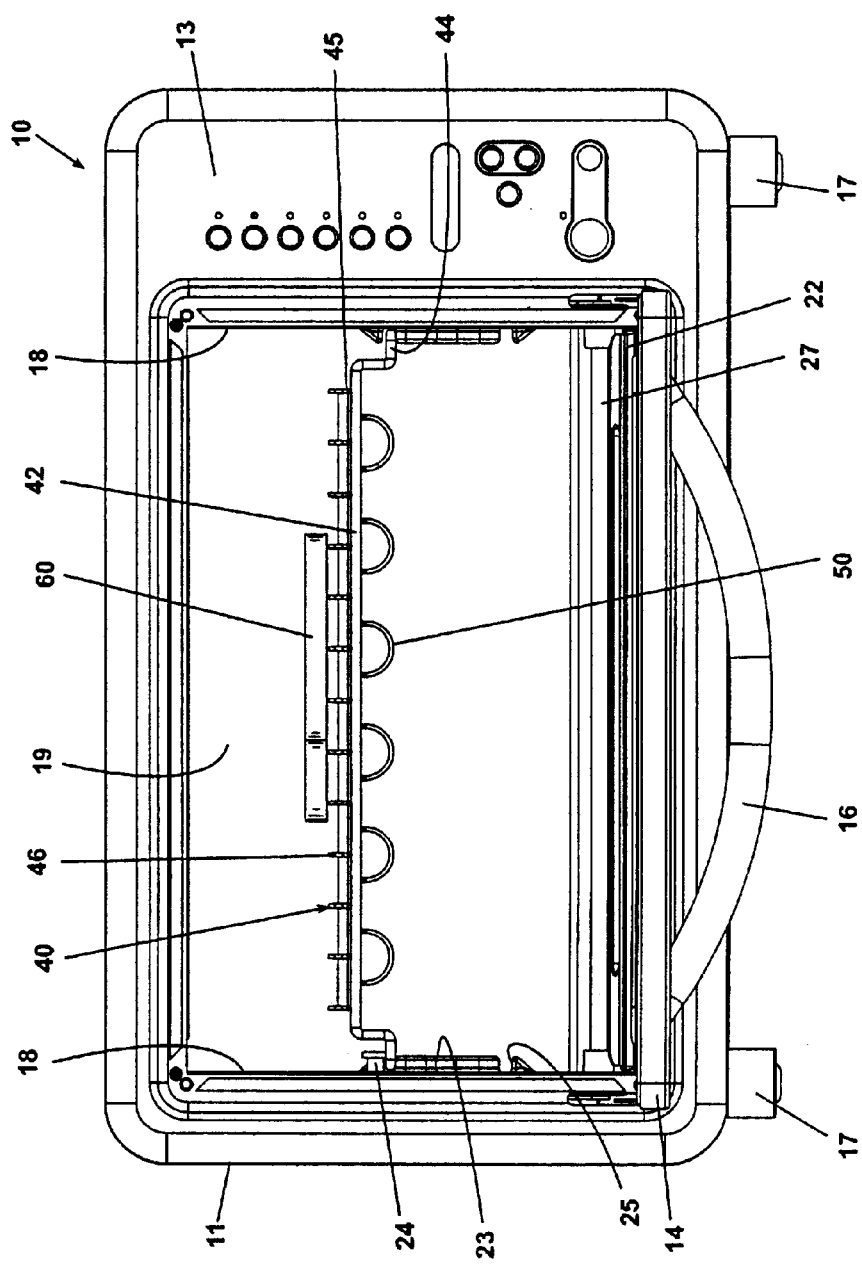
FIG. 2 is a partial perspective view of the toaster oven with a rack according to the present invention positioned in the oven with the side of the rack having projections up and supporting a piece of bread for toasting.
Figure 3:
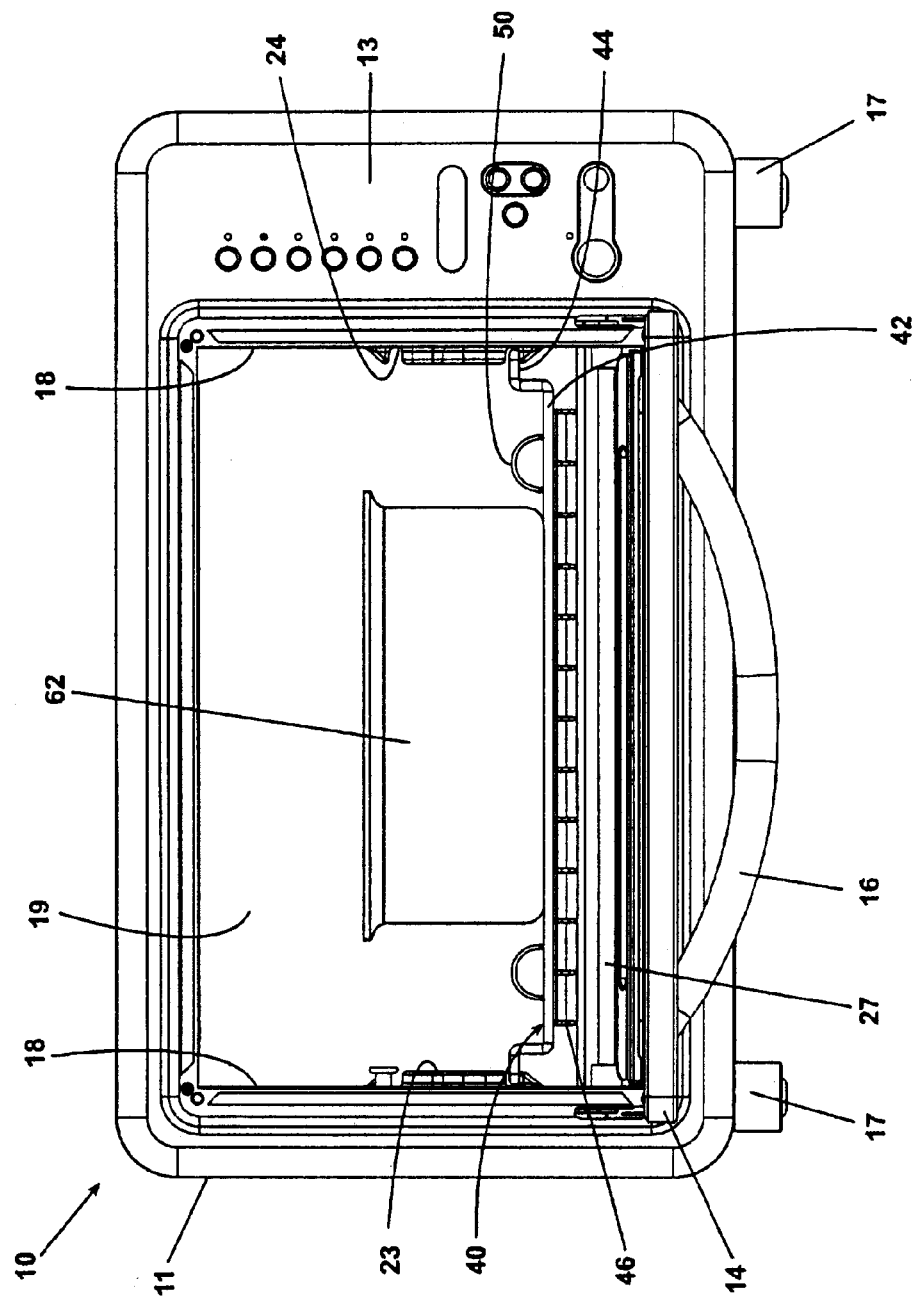
FIG. 3 is a partial perspective view of the toaster oven with a rack according to the present invention positioned in the oven with the side of the rack having projections down and supporting a container holding food items for cooking on the substantially flat surface of the rack.

Referring to the drawings, and in particular to FIG. 1–3, a toaster oven associated with the present invention is generally indicated at 70. The toaster oven 70 includes a cabinet 11 having top, side, back and bottom walls. A front wall 12 includes a door frame and control panel area 13. A door 14 having a window 15 is provided to close the toaster oven cavity. Door 14 is mounted to the cabinet 11 by conventional horizontal axis hinges, not shown. A conventional latch, not shown, is provided to hold the door 14 in the closed position. In the closed position a door switch, not shown, is closed to permit operation of the toaster oven when the door is closed. A handle 16 is provided on the door 14 to move the door 74 between its open and closed positions. In this embodiment handle 16 is dimensioned to support door 14 in a horizontal position when the door is fully open. Feet 17 can be provided to support cabinet 11 spaced from the surface on which the toaster oven is placed.

The toaster oven 10 has cavity defined by side walls 18, a back wall 19, a top wall 20 and a bottom wall 21. As is well known in the art insulation, not shown, is positioned between the walls of the cavity and the cabinet 11. Carried on bottom wall 21 is a conventional crumb tray 22 that can easily be removed from the toaster oven for cleaning. Side walls 18 and back wall 19 can be made of steel with a suitable non-stick coating as is known in the art for ease of cleaning. Bottom wall 21 can be made of galvanized steel. Top wall 20 and crumb tray 22 can be made of stainless steel for reflecting heat to food being cooked in the toaster oven.

Each side wall 18 carries a rack support 23. Each rack support 23 has two vertically spaced channels 24 and 25 for supporting a rack 40 at two vertically spaced locations in the cavity. While two channels 24 and 25 are shown in this embodiment, those skilled in the art will recognize that one channel or more than two channels can be provided in the rack supports in order to facilitate cooking of a variety of foods requiring greater or smaller spacing from the heating elements.

Located in the toaster oven cavity are a plurality of electric heating elements 27 positioned adjacent the top wall 20 and bottom wall 21. In this embodiment there are three electric heating elements 27 positioned adjacent top wall 20 and three electric heating elements 27 adjacent the bottom wall 21. As is well known in the art, more or fewer than three heating elements can be provided adjacent the top and bottom walls as desired. Also located adjacent the top wall 20 and bottom wall 21 are temperature sensors, not shown, which can be thermistors and connected to a controller, not shown, for controlling the temperature in the toaster oven. Located in the upper right rear corner is a light and cover assembly 28 for selectively illuminating the cavity such as when the toaster oven is operating and/or when the door 14 is opened.

On each side of the cabinet 11 there is a vent 26 to help keep the cabinet 17 and toaster oven controls cool. Located behind control area 13 in the space between cavity. right side wall 18 and the cabinet is a space for components such as a power supply, a controller, a cooling fan, a convection fan and the like as is well known in the art. In control area 13 there are provided a series of mode selection buttons 30. In this embodiment mode selection buttons are included for Bake, Broil, Convection Bake, Toast, Dehydrate and Warm functions. It will be appreciated by those skilled in the art that more or less or different mode selections could be provided, and that a rotary selection knob could be used to select the operating mode instead of the push buttons shown. Located in control area 13 below the mode selection buttons 30 is a display 31. In this embodiment display 31 is connected to the controller, not shown, to display the temperature selected and the cooking time. The controller and display could be configured to display different or additional information about the toaster oven operation as is well known in the art. Located below display 31 is a Set button 32 which, when pressed, allows the user to select and adjust the cooking time or temperature. Located adjacent to Set button 32 are an Up button 33 and a Down button 34 connected to the controller to allow the user to increase or decrease the time or temperature selected after the Set button 32 has been operated to initiate adjustment of cooking time or temperature. Located below the Set, Up and Down buttons are a Start button 35 and an End button 36. After the mode, time and temperature have been selected operation of the Start button 35 initiates operation of the toaster oven in the selected mode. The End button 36 allows the user to stop the toaster oven before the selected operating time has elapsed.

Figure 4:
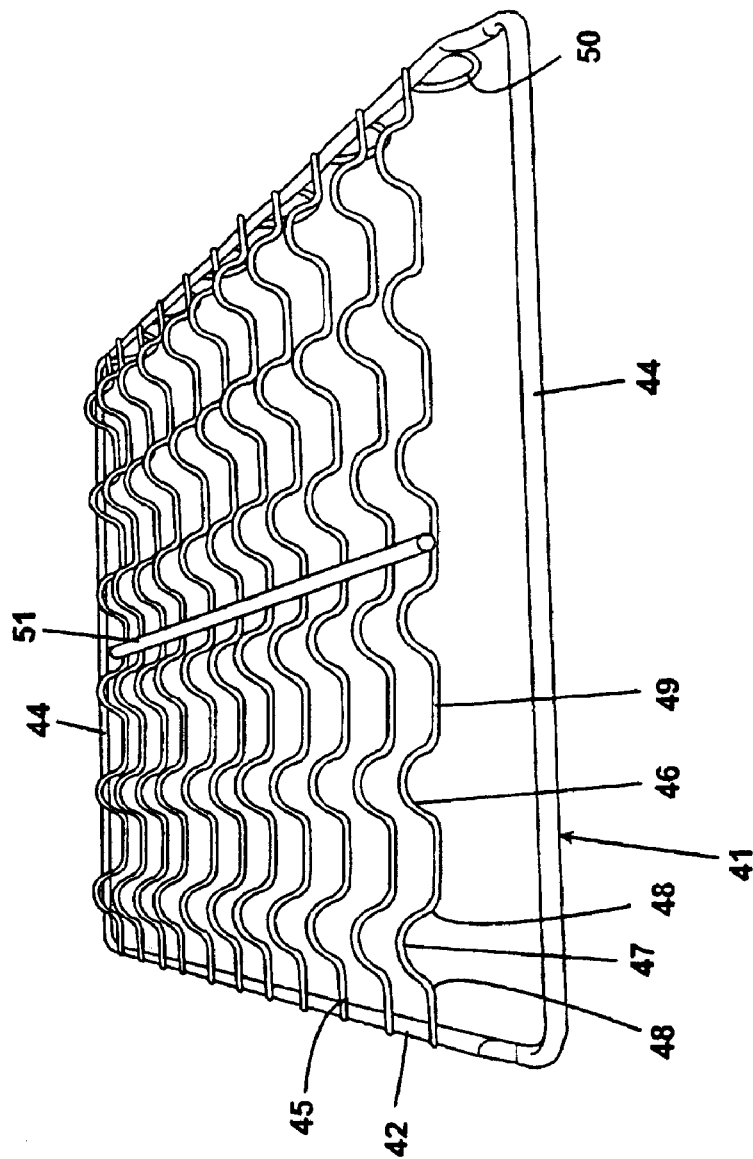
FIG. 4 is a perspective view of the rack removed from the toaster oven with the side of the rack having projections up.
Figure 5:
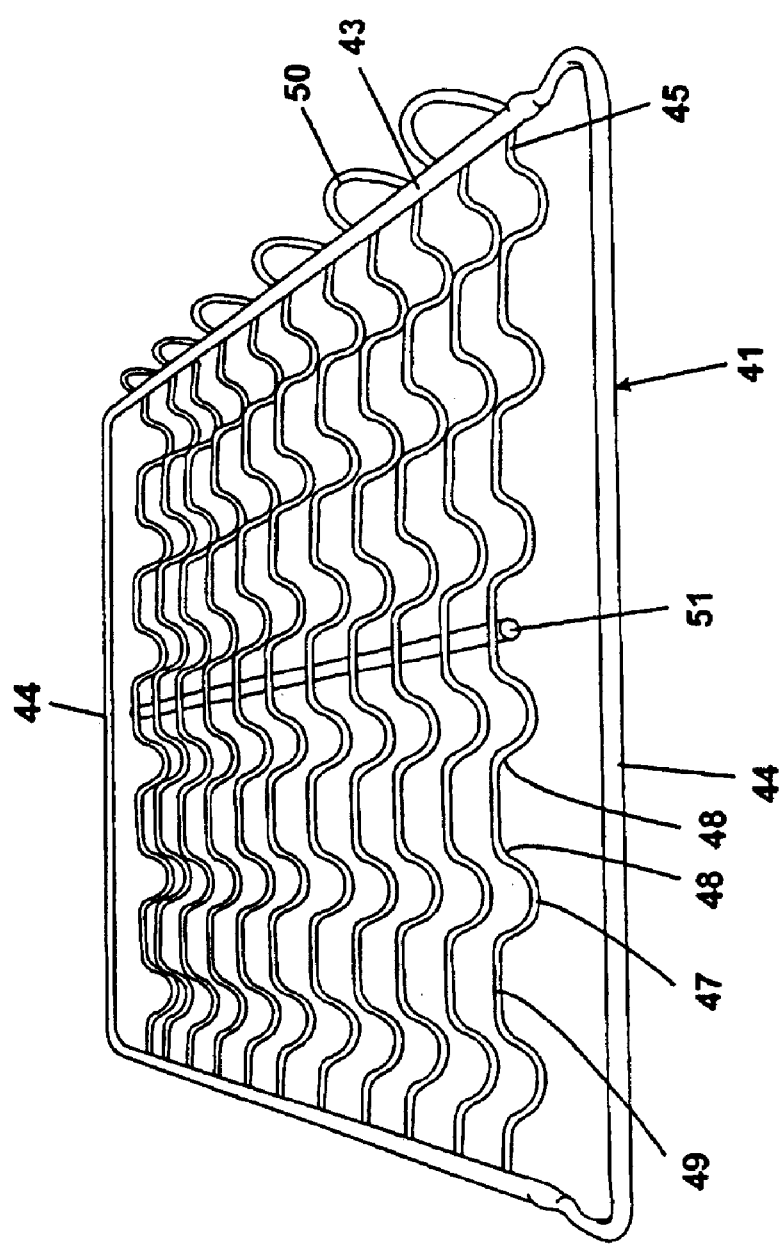
FIG. 5 is a perspective view of the rack removed from the toaster oven with the side of the rack having projections down.

Referring to FIG. 4 and FIG. 5, rack 40 is shown removed from the toaster oven 10. The rack includes a four sided frame 41 having a front element 42, a rear element 43, and end elements 44. In the embodiment shown in FIG. 4 and FIG. 5 the end elements 44 are offset from the plane of the rack defined by the front element 42 and the rear element 43. While offset end elements 44 are shown in this embodiment, one skilled in the art will understand that, if so desired, the end elements can be provided in the plane of the rack as defined by the front element 42 and rear element 43. Positioned across the front element 42 and rear element 43 are a plurality of support wires 45. In this embodiment each of the support wires, 45 has a plurality of projections 46 formed along the length of the support wire. In this embodiment the projections are rounded at the peak 47 and have rounded transitions: 48 to the straight portions 49 of the support wires 45. While the projections shown in this embodiment are rounded, other shapes such as rounded triangle or rounded rectangle shapes could be used instead. The rounded shape for projections 46 shown in this embodiment facilitates forming the rack 40. The height of the projections 46 in this embodiment is sufficient to hold bread and the like away from the straight portions 49 of the support wires 45 to allow bread being toasted in the toaster oven to brown in the areas above the support wires 45. Positioned along the rear element 43 are a plurality of wire loops 50 attached in a plane perpendicular to the plane of the rack defined by front element 42 and rear element 43. When rack 40 is used in the position shown in FIG. 3 and FIG. 5 with the projections 46 down, the loops 50 function as a partial rear wall to prevent food items from sliding off the rear of the rack 40 as the rack is withdrawn from the toaster oven 10. As will be obvious to one skilled in the art, loops 50 could be eliminated if desired. Rack 40 also has a center support wire 51 lying across support wires 45 to reinforce and stabilize the support wires 45. In this embodiment center support wire 51 is a heavier gage wire than the support wires 45. As is conventional in the art, rack 40 is constructed by forming the elements, assembling and welding the elements in place, and then chrome plating the rack for appearance and corrosion resistance. It will be appreciated by those skilled in the art that other known rack forming methods could be used to manufacture the rack 40.

The use of rack 40 in a toaster oven for toasting is shown in FIG. 2. In FIG. 2 the rack 40 is positioned in cavity with projections 46 up. A piece of bread 60 is shown lying on rack 40. The projections 46 are dimensioned so that the piece of bread 60 is generally supported above the surface of rack 40 and out of contact with straight portions 49 of rack 40. By holding most of the piece of bread 60 out of contact with the rack 40 the portions of the piece of bread above the straight portions 49 will brown in the toasting process. When a rack having straight support wires is used for toasting bread unbrowned, often white, lines where the bread was in contact with the support wires are present at the end of the toasting process. Applicants have found that by providing projections on one side of the rack 40, toast without the conventional toaster oven stripes can easily be prepared. Instead of white lines, applicants have found that, at most, unbrowned dots corresponding to projections 46 contacted by the piece of bread result when bread is toasted on the rack according to the invention. In this embodiment six projections 46 are shown on each support wire 45 in order to provide maximum flexibility is loading bread to be toasted into the oven, namely, different shapes and sizes. It will be appreciated by those skilled in the art that fewer than six projections 46 could be provided on each support wire 45. Likewise, it will be appreciated that projections 46 need not be provided on each support wire 45 as shown in this embodiment, but rather projections could be provided on every other or every third support wire if desired. As mentioned above, providing six projections 46 on each support wire 45 provides flexibility is loading bread for toasting in the toaster oven.

The use of the toaster oven 10 for cooking food in a dish or container is shown in FIG. 3. In FIG. 3 the rack 40 is positioned in the toaster oven 10 with the projections 46 down. Resting on rack 40 is a container 62 holding food to be cooked in the toaster oven. Container 62 rests on straight portions 49 of rack 40. By providing a relatively flat surface, comprising straight portions 49, a rigid container 62 is solidly supported on rack 40 without tipping. As mentioned above, when rack 40 is withdrawn from the cavity, loops 50 prevent container 62 from sliding off the rear of the rack 40.

When FIG. 2 and FIG. 3 are compared the effect of providing offset end elements 44 can be seen. In FIG. 2 with the offset end elements down and the projections 46 up, bread to be toasted in near to the middle of the cavity. In FIG. 3 with the offset end elements 44 up and projections 46 down container 62 is low in cavity nearer to the bottom wall 27 to increase the vertical usable space in cavity. The position of bread to be toasted or a container of food to be cooked can be further adjusted in this embodiment by placing the rack 40 in the upper rack support channels 24 or the lower rack support channels 25 in rack supports 23.

While the invention has been specifically described in connection with certain specific embodiments thereof, it is to be understood that this is by way of illustration and not of limitation, and the scope of the appended claims should be construed as broadly as the prior art will permit.

What is claimed is:

1. A toaster oven comprising:
    a cabinet enclosing an insulated oven cavity having a pair of side walls;
    heating means for heating said oven cavity;
    a door mounted to said cabinet for closing said oven cavity; and
    a rack arranged to be placed in said cavity for supporting food in said cavity, said rack having a frame and a plurality of support wires, wherein at least some of said support wires have a plurality of projections on a first side of said rack.

2. The toaster oven of claim 1 wherein said projections on said first side of said rack are arranged to engage food items placed on the first side of said rack to carry said food items substantially out of contact with said support wires.

3. The toaster oven of claim 1 wherein each of said support wires has a plurality of projections.

4. The toaster oven of claim 1 wherein each of said support wires has six projections.

5. The toaster oven of any of claims 1 through 4 wherein said projections are formed in said support wires.

6. The toaster oven of claim 5 wherein said projections are a rounded triangular shape.

7. The toaster oven of claim 5 wherein said projections are a rounded shape.

8. The toaster oven of claim 5 wherein said projections are a rounded rectangular shape.

9. The toaster oven of claim 1 wherein said rack has a center support wire extending across and supporting said support wires.

10. The toaster oven of claim 1 wherein said support wires extend generally parallel to the side walls of said cavity.

11. The toaster oven of claim 1 wherein said rack has a substantially flat second side and said rack may be placed in said cavity with said first side up to support food items in said cavity on said projections, or with said first side down to support items on the substantially flat surface of the second side of said rack.

12. The toaster oven of claim 1 wherein said cavity includes rack support means on said side walls;

said frame includes end portions arranged to engage said rack support means; and said end portions are offset from the plane of said rack so that said rack is positioned at different vertical positions in said cavity depending on which side of said rack is positioned up in said cavity.

13. The toaster oven of claim 12 wherein said end portions of said frame are offset from the plane of said rack in the opposite direction of said wire projections, whereby when said rack is installed in said cavity with said first side up, said rack is positioned higher in said cavity than when said rack is installed with said first side down.

14. A toaster oven comprising:

a cabinet enclosing an insulated oven cavity, said cavity having top, bottom, side and rear walls, and said side walls each have rack support means;

electric heating means for heating said oven cavity;

a door mounted to said cabinet for closing said oven cavity; and a reversible generally planar rack arranged to be placed in said cavity for supporting food in said cavity including:

a frame including end portions vertically offset from the plane of said rack and arranged to engage said rack support means; and a plurality of support wires attached to said frame, wherein at least some of said support wires have a plurality of projections formed thereon along the length of said support wires on a first side of said rack and arranged to support food items in said cavity on said projections.

15. The toaster oven of claim 14 wherein said support wires extend parallel to said side walls of said cavity.

16. The toaster oven of claim 14 wherein each of said support wires has six projections formed thereon.

17. The toaster oven of claim 14 wherein said rack has a center support wire extending across and supporting said support wires.

18. The toaster oven of any of claims 14–17 wherein said rack may be placed in said cavity with said first side up to support food items substantially out of contact with said support wires, or with said first side down to support items in said cavity on the substantially flat surface of the second side of said rack.

19. The toaster oven of claim 14 wherein each of said rack support means includes at least one channel arranged to receive the end portions of said frame to support said rack in said cavity.

20. The toaster oven of claim 19 wherein each of said rack support means includes two vertically spaced channels for supporting said rack in multiple vertical positions in said cavity.

* * * * *